United States Patent [19]
Lai

[11] Patent Number: 4,817,294
[45] Date of Patent: Apr. 4, 1989

[54] CLUB HEAD ANGLE MEASURING INSTRUMENT

[76] Inventor: Shui-Chuan Lai, 69, Ting Sheng Street, Chien Chin District, Kaoshsiung, Taiwan

[21] Appl. No.: 105,360

[22] Filed: Oct. 8, 1987

[51] Int. Cl.$^4$ .............................................. G01B 5/24
[52] U.S. Cl. ..................................................... 33/508
[58] Field of Search ............................ 33/508; 72/293; 273/32 R, 32 B

[56] References Cited

U.S. PATENT DOCUMENTS

| | | | |
|---|---|---|---|
| 3,822,477 | 7/1974 | Collins | 33/508 |
| 4,094,072 | 6/1978 | Erb | 33/508 |
| 4,245,392 | 1/1981 | Heller | 33/508 |
| 4,640,017 | 2/1987 | Cukor | 33/508 |

Primary Examiner—Harry N. Haroian
Attorney, Agent, or Firm—Varndell Legal Group

[57] ABSTRACT

A club head angle measuring instrument comprises a balance base, a graduated curve, an adjusting rod, an indicator, a club holder and a slide unit. The adjusting rod is connected with the graduated curve at the rear end. The club holder fixed to the adjusting rod is used to hold the shaft of the club. The indicator is used to adjust the angle. The balance base has a balance block for the club head to rest. A special protractor is provided to set the angle of inclination of the club head. The slide unit has a pair of angle gauges for adjusting the sole angle, and a pair of triangular balance plates for adjusting the balance of the club head. It can be used for the manufacturer to set and correct the angle of the club head, for the distributor to assemble the club, and for the golfer to use the clubs.

9 Claims, 7 Drawing Sheets

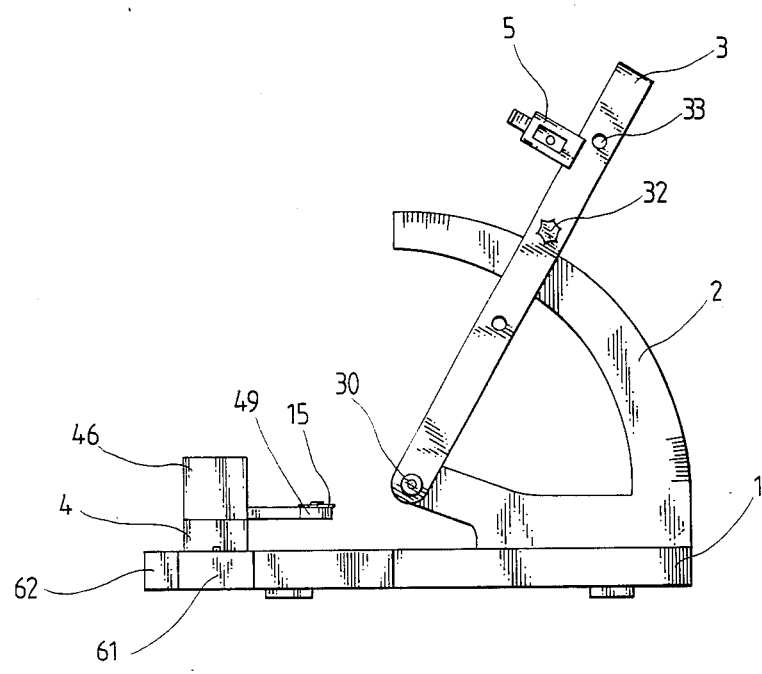
FIG. 2
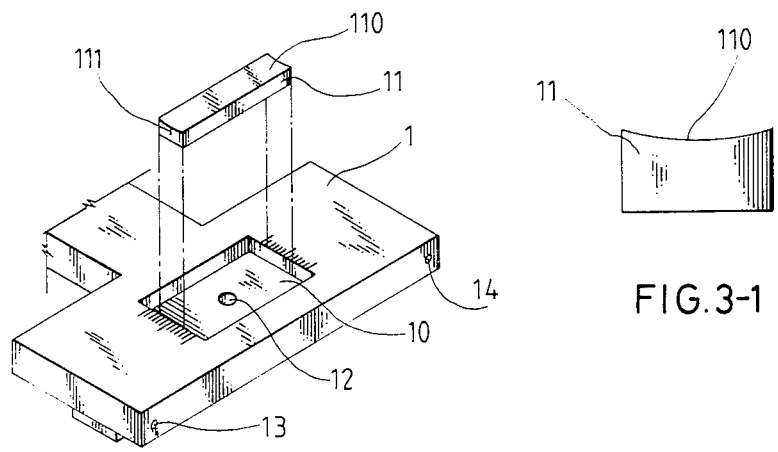
FIG. 3
FIG. 3-1

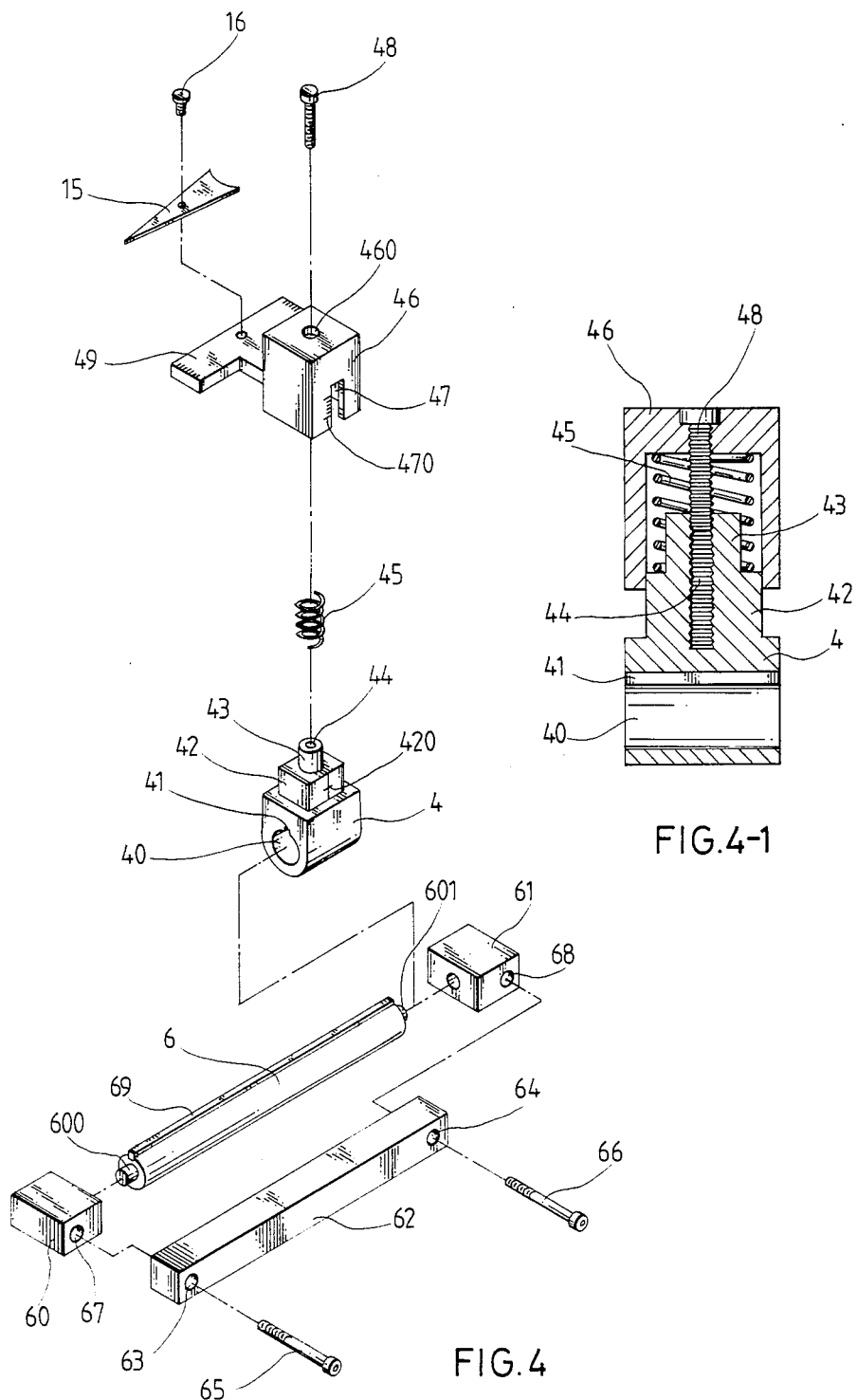

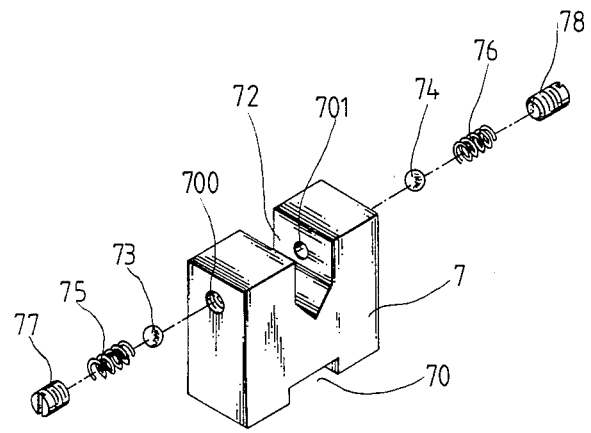
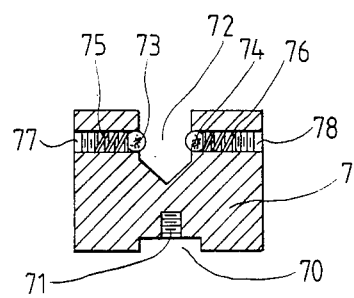
FIG.7  FIG.7-1
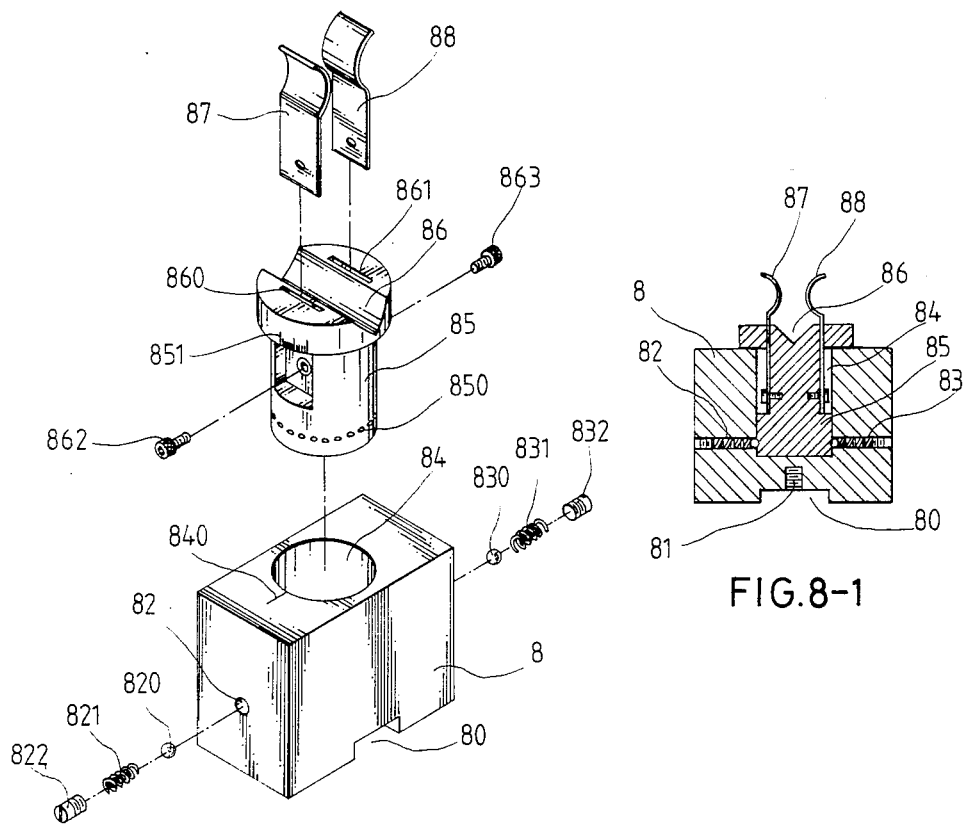
FIG.8  FIG.8-1

CLUB HEAD ANGLE MEASURING INSTRUMENT

BACKGROUND AND SUMMARY OF THE INVENTION

People who like to play golf know the golf course is very large. It consists of slopes, ponds, bunkers, trees, green, etc. and various clubs must be used to meet different conditions. So golfers often carry a number of golf clubs for use. Since the shafts of woods, irons, wedges and putters are different, it is very important to align the shaft and head.

So the main object of this invention is to provide a club head angle measuring instrument which can be used to measure the angle of club head, to check the error, and to help the golfer use the clubs.

BRIEF DESCRIPTION OF THE DRAWINGS

FIG. 2 is a right side view of the said instrument.

FIG. 3 is an exploded view of the balance base and balance block of the said instrument.

FIG. 3-1 is a side view of the balance block as shown in FIG. 3.

FIG. 4 is an exploded view of the slide unit of the said instrument.

FIG. 4-1 is a vertical section of the said slide unit.

FIG. 5-1 is a vertical section of the club holder as shown in FIG. 5.

FIG. 7 is an exploded view of the first embodiment of the said club holder.

FIG. 7-1 is a vertical section of the first embodiment of the said club holder.

FIG. 8 is an exploded view of the second embodiment of the said club holder.

FIG. 8-1 is a vertical section of the second embodiment of the said club holder.

DETAILED DESCRIPTION OF THE PREFERRED EMBODIMENT

Figure 1:
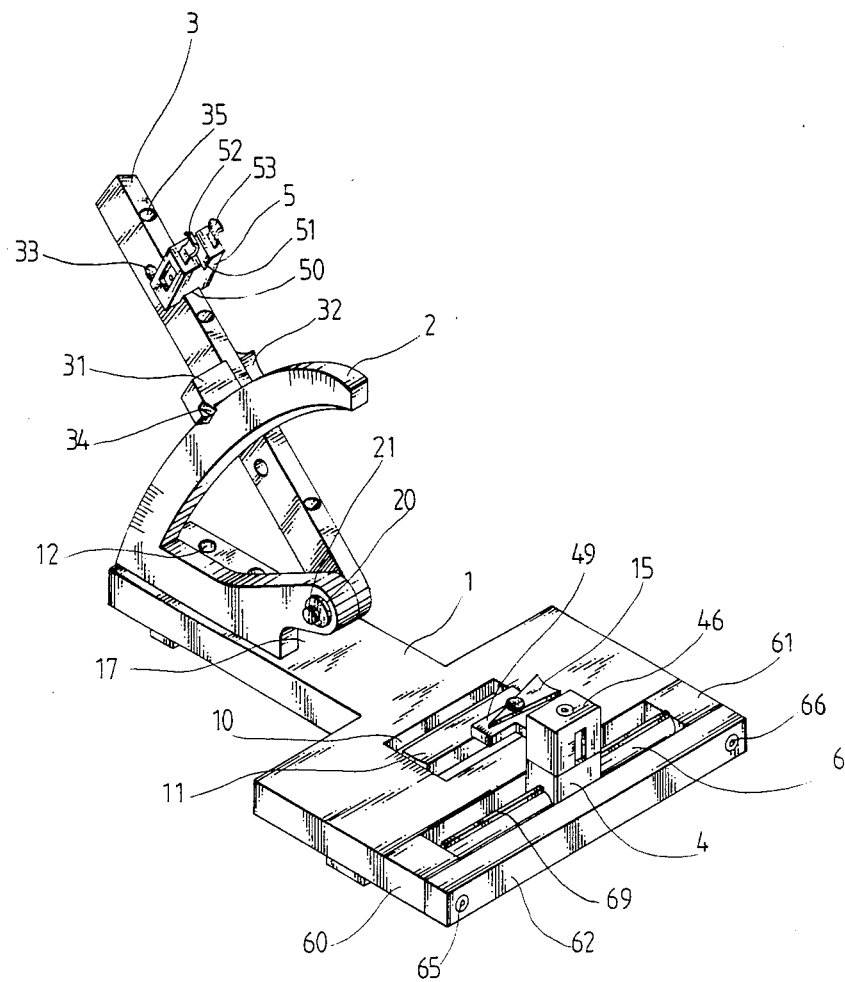
FIG. 1 is a vertical view of the club head angle measuring instrument of this invention.

As shown in FIGS. 1, 2, 3, 3-1, 4 and 4-1, the club head angle measuring instrument of this invention comprises a balance base 1, a graduated curve 2, an adjusting rod 3, an indicator 31 and a club holder 5. The adjusting rod 3 is connected to the curve 2 at the rear end by means of a bolt 21 fitted in the fulcrum hole 30 in the adjusting rod 3 and the hole 20 in the curve 2. The indicator 31 is fixed to the adjusting rod 3 with a screw 32 in one of the lateral holes 33 in the adjusting rod 3, and has a pointer to make a reading by pointing the scale on the curve 2. To move the adjusting rod 3, the screw 32 must be loosened first. The joint of the curve 2 and the adjusting rod 3 with the holes 20, 30 is a precise joint and the error is minimized. The measurement can be made to 0.5 degree. The club holder 5 which is more clearly shown in FIG. 5 has a groove 50 in the bottom side for fitting on the adjusting rod 3, a notch down the middle of the top surface, two spring plates 52, 53 for holding the club shaft of different sizes. To measure the angle of the right or left handed club head, screw holes 12 are provided on both sides of the balance base 1 for fixing the graduated curve 2 selectively on either side. The graduated curve 2 has a scale cut on each side for measuring the left or right handed club, and a space 17 formed between the rear end with a pivot hole 20 and the balance base 1 for accommodating the long head of a putter.

The balance base 1 has a square recess 10 in the front part for receiving a balance block 11. The balance block 11 about 25 mm wide has a curved surface 110 on the top corresponding to the sole of the club head, and two aligning lines 111 cut respectively in the middle of both sides. After being placed in the square recess 10 of the balance base 1, the balance block 11 projects a little out of the square recess 10 so that the aligning lines 111 can be used together with the scales on both edges of the square recess 10 for adjusting the position of the club head on the balance block 11 by moving the balance block 11. A hole 12 is provided in the bottom of the square recess 10 for pushing the balance block 11 out of the square recess 10 with a stick when necessary. A slide unit attached to the balance base 1 consists of a slide 4, a spring 45, a cover 46, an angle gauge 49, a guide bar 6, two support blocks 60, 61 and a support piece 62. The slide 4 has a guide hole 40 with a groove 41 for a guide bar 6 with a rib 69 to fit in for smooth sliding, a square part 42, and a stud 43 with a screw hole 44. The spring 45 is fitted on the stud 43 of the slide 4. The cover 46 is placed on the spring 45 and fixed to the stud 43 by means of a screw 48 which is in the hole 460 and screwed in the screw hole 44. The angle gauge 49 connected to the cover 46 has a triangular balance plate 15 turnably attached to the top with a screw 16. To measure the balance of the club head with the triangular balance plate 15, the height of the angle gauge 49 is adjusted by moving the cover 46 up and down with the screw 48. The angle gauge 49 has scale on the left and right edges so that with the sliding of the slide 41 and the turning of the triangular balance plate 15, it can be used to measure both left and right handed club heads. The cover 46 has a Ω slot 47 in the front side and a scale 470 cut on one edge of the slot 47, used together with the mark 420 on the front side of the square part 42 of the slide 4 to measure club heads of same height. The guide bar 6 has two studs 600,601 on each end to be inserted in the support blocks 60, 61 which are fixed together with the support piece 62 to the balance base 1 by means of screws 65,66 in the holes 63, 64 of the support piece 62 and the holes 67, 68 of the support blocks 60, 61.

Figure 6:
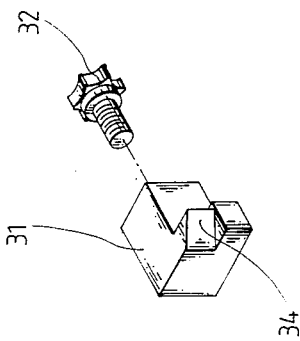
FIG. 6 is vertical view of the indicator of the said instrument.
Figures 1, 5:
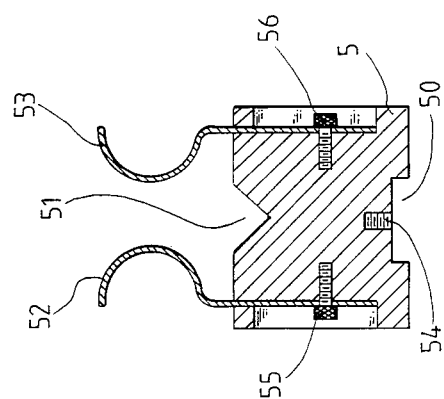
FIG. 5 is an exploded view of the adjustable club holder of the said instrument.
Figure 5:
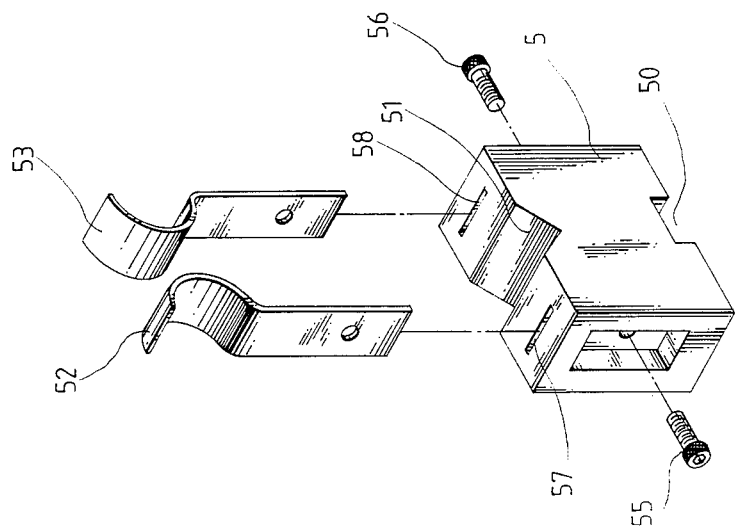

As shown in FIGS. 5 and 5-1, the club holder 5 has a screw hole 54 in the bottom of the groove 50, used together with the hole 35 in the front side of the adjusting rod 3, two deep, narrow hollows 57, 58 in the left and right parts on the notch 51 for the spring plates 52, 53 to fit in and to be fixed by the screws 55, 56. After the shaft of the club is snapped in the spring plates 52, 53, it is held by the club holder 5. As shown in FIG. 6, the indicator 31 is fixed to the adjusting rod 3 with a screw 32 and has a pointed part 34 used to point the degree on the scale for adjusting purpose.

FIGS. 7 and 7-1 show another club holder 7. This club holder 7 also has a groove 70 in the bottom side, a screw hole 71 in the bottom of the groove 70, a notch 72 at the top for accommodating the shaft of the club, two through holes 700, 701 in both sides, two balls 73, 74 and two springs 75, 76 placed in the holes 700, 701 and two screws 77, 78 screwed in the holes 700, 701 and used as a stop of the springs 75, 76. Pushed by the springs 75, 76, the balls 73, 74 will hold the club shaft after it is snapped in the notch 72.

FIGS. 8 and 8-1 show still another club holder 8. This club holder 8 has a groove 80 at the bottom side, a screw hole 81 in the bottom of the groove 80, two through holes 82, 83 in both sides, a hollow 84, a cylinder 85 fitted in the hollow 84, and two spring plates 87, 88. In the through holes 82, 83, are fitted with balls 820, 830 and springs 821, 831 and screwed with screws 822, 832. Pushed by the springs 821, 831, the balls 820, 830 come partially out into the hollow 84. The cylinder 85 has a ring of holes 850 arranged on the bottom at intervals of ½ degree. The cylinder 85 turns ½ degree when the ball moves from one hole 850 to another. The cylinder also has a scale 851 on the top rim used with the mark 840 on the edge of the hollow 84 to show the degree. Corresponding to the hole intervals, the distance between two marks of the scale is equal to ½ degree. In addition, the cylinder 85 has a notch 86 at the top, two deep holes 860, 861 by the notch 86 in which two spring plates 87, 88 is fitted and fixed by two screws 862, 863. So the club holder 8 can be used to hold the club as well as to measure the correct angle of the club.

Figure 9:
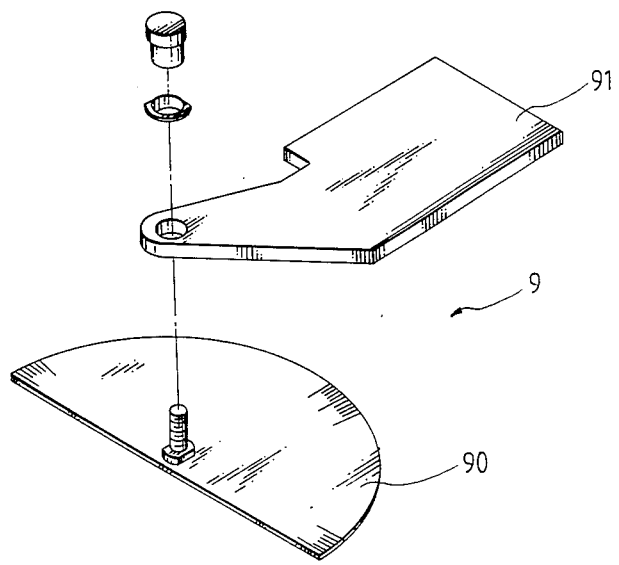
FIG. 9 is an exploded view of the angle gauge of the said instrument.
Figure 10:
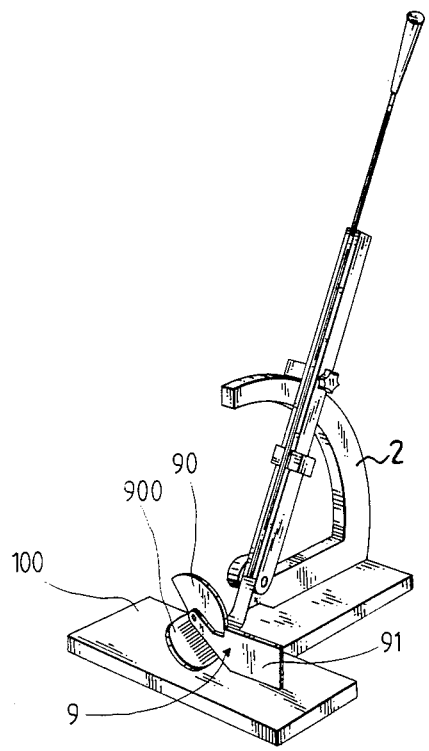
FIG. 10 illustrates the application of the said angle gauge.

As shown in FIGS. 9 and 10, a special protractor 9 is used to measure the angle of inclination of the club head 900. The graduated semicircle 90 is adjusted to a particular angle to be measured. Then the head 900 is fitted on the shaft which has already been fixed. After making balance measurement, the support 91 of the special protractor 9 is put on the balance base 100 with the graduated semicircle 90 resting on the club head to check for correct angle.

Figure 11:
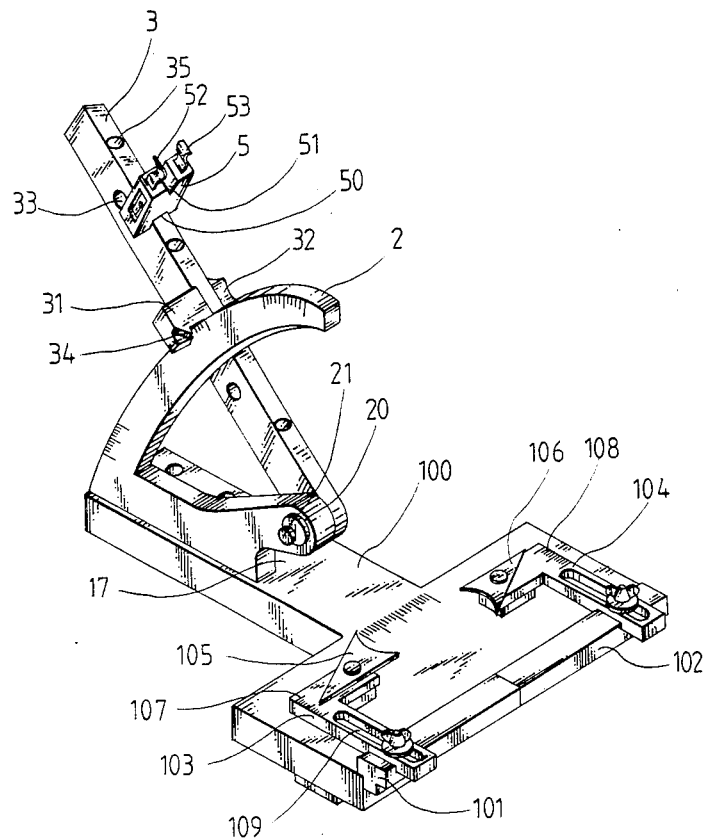
FIG. 11 is a vertical view of another embodiment of this invention.

As shown in FIG. 11, a flat balance base 100 and two T slides 101, 102 can be used. A pair of symmetrical angle gauges 103, 104 is mounted on the T slides 101, 102 with screws and a pair of triangular balance plates 105, 106 is mounted on the angle gauges 103, 104. The T slides can slide laterally on the balance base 100 while the angle gauges 103, 104 with slots 109 can move after the screws are loosened. The triangular balance plates 105, 106 can be used to measure the balance of the club head.

I claim:

1. A club head angle measuring instrument comprising a balance base, a graduated curve mounted on the base, an adjusting rod connected with the graduated curve at the rear end, a club holder fixed to the adjusting rod, an indicator fixed to the adjusting rod and engaging the graduated curve, and a slide fitted on a guide bar in the front of the balance base.

2. A club head angle measuring instrument according to claim 1 wherein the balance base has a square recess and a balance block fitted in the recess and having a curved surface to meet the sole of the club head.

3. A club head angle measuring instrument according to claim 1 wherein the graduated curve has scales on both sides.

4. A club head angle measuring instrument according to claim 1 wherein the adjusting rod has vertical and lateral holes for fixing the indicator and club holder.

5. A club head angle measuring instrument according to claim 1 wherein the club holder has a groove at the bottom side, a screw hole in the bottom of the groove for fixing itself to the adjusting rod, a notch on the top, two deep holes beside the notch, a pair of spring plates fitted in the deep holes and fixed therein with screws for holding the club shaft after it is snapped in, or two through holes in the side parts on the notch for two balls and two springs to fit in and to be stopped by two screws in such way that the balls pushed by the spring come partially out into the notch to hold the club shaft after it is snapped in, or a hollow for a cylinder to fit in and to be held by two spring-pushed balls fitted in the side holes like above; said cylinder having holes arranged in a ring on the bottom and at intervals of ½ degree for the balls to snap in and for adjusting the angle, and a notch and two spring plates at the top for holding the club shaft.

6. A club head angle measuring instrument according to claim 1 wherein the slide has a hole and groove for fitting and sliding smoothly on a guide bar with a rib, a square part and stud, a spring fitted over the stud, a cover fitted on the spring and adjustably fixed to the stud with a screw, and an angle gauge with a triangular balance plate for measuring the balance of the club head.

7. A club head angle measuring instrument according to claim 6 wherein the cover has an inverted U opening in the front side, a scale at one edge on the inverted U opening, used together with the mark on the front side of the square part of the slide to adjust the height for measuring the club head.

8. A club head angle measuring instrument comprising a balance base having a flat base and a protractor with a graduated semicircle for measuring an angle of inclination of the club head, a graduated curve mounted on the balance base, an adjusting rod connected with the graduated curve, and an indicator fixed to the adjusting rod and engaging the graduated curve.

9. A club head angle measuring instrument comprising a balance base having a flat base with a slide unit consisting of a T slide, a pair of angle gauges movably fixed to the slide with screws, and a pair of triangular plates turnably mounted on the angle gauges for measuring the balance of the club head; a graduated curve mounted on the base; an adjusting rod connected with the graduated curve at the rear end; an indicator fixed to the adjusting rod and engaging the graduated curve; and a club holder fixed to the adjusting rod.

* * * * *